(12) United States Patent
Horinaka et al.

(10) Patent No.: US 9,038,496 B2
(45) Date of Patent: May 26, 2015

(54) ADJUSTING DEVICE AND CONTROL CABLE WITH ADJUSTING DEVICE

(75) Inventors: Takahiro Horinaka, Takarazuka (JP); Atsushi Nishimura, Takarazuka (JP)

(73) Assignee: HI-LEX CORPORATION, Hyogo (JP)

( * ) Notice: Subject to any disclaimer, the term of this patent is extended or adjusted under 35 U.S.C. 154(b) by 704 days.

(21) Appl. No.: 12/162,782

(22) PCT Filed: Jan. 30, 2007

(86) PCT No.: PCT/JP2007/051451
§ 371 (c)(1), (2), (4) Date: Jul. 30, 2008

(87) PCT Pub. No.: WO2007/086572
PCT Pub. Date: Aug. 2, 2007

(65) Prior Publication Data
US 2009/0049947 A1    Feb. 26, 2009

(30) Foreign Application Priority Data
Jan. 30, 2006  (JP) .................................. 2006-021544

(51) Int. Cl.
*F16C 1/14*  (2006.01)
*F16C 1/22*  (2006.01)

(52) U.S. Cl.
CPC .. *F16C 1/223* (2013.01); *F16C 1/14* (2013.01)

(58) Field of Classification Search
CPC ............ F16C 1/262; F16C 1/26; F16C 1/226; F16C 1/223; F16C 1/22; F16C 1/20; F16C 1/145; F16C 1/14; F16C 1/12; G05G 5/22; G05G 5/24

USPC ................... 74/502.4–502.6, 501.5 R, 500.5
See application file for complete search history.

(56) References Cited

U.S. PATENT DOCUMENTS

| | | | | |
|---|---|---|---|---|
| 3,019,663 | A | * | 2/1962 | Breunich ........................ 74/18.2 |
| 3,790,734 | A | * | 2/1974 | Raab et al. .................. 200/302.2 |
| 3,946,845 | A | * | 3/1976 | Kamio ....................... 192/70.252 |
| 4,694,706 | A | * | 9/1987 | Lichtenberg et al. .... 74/501.5 R |
| 4,753,123 | A | * | 6/1988 | Stormont ...................... 74/500.5 |
| 5,673,596 | A |   | 10/1997 | Lu |
| 6,263,756 | B1 | * | 7/2001 | Gabas Cebollero et al. 74/502.4 |
| 6,453,765 | B1 | * | 9/2002 | Waldow et al. .............. 74/502.6 |
| 2006/0230868 | A1 | * | 10/2006 | Ruhlander et al. ........ 74/501.5 R |

FOREIGN PATENT DOCUMENTS

| | | | |
|---|---|---|---|
| DE | 3305417 C1 | * | 6/1984 |
| DE | 3929298 A1 | * | 3/1990 |
| JP | 7-301225 A |   | 11/1995 |
| JP | 8-210576 A |   | 8/1996 |
| JP | 09317749 A | * | 12/1997 |

(Continued)

*Primary Examiner* — Daniel Yabut
(74) *Attorney, Agent, or Firm* — Browdy and Neimark, PLLC

(57) ABSTRACT

An adjusting device is equipped with a rod and a holder disposed movably in the direction of the length of the rod at an end of the rod, and adjusts the allowance length of the inner cable coupled to the rod and (or) holder. The adjusting device is provided with a lock-discriminating member protruding from the periphery of the holder and a cover covering the periphery of the holder including the lock-discriminating member and the lock. The lock piece does not protrude from the periphery of the holder in the lock state and protrudes to the same height with the lock-discriminating member in the unlock state.

6 Claims, 6 Drawing Sheets

(56) References Cited

FOREIGN PATENT DOCUMENTS

| | | |
|---|---|---|
| JP | 56-62231 U1 | 9/2000 |
| JP | 2003-166521 A | 6/2003 |
| JP | 2004052968 A1 | 2/2004 |
| JP | 2004-257488 A | 6/2004 |
| JP | 2005-147393 A | 6/2005 |
| JP | 2005-172203 A | 6/2005 |
| JP | 2006183834 A * | 7/2006 |
| WO | WO 9215468 A1 * | 9/1992 |

* cited by examiner

_US 9,038,496 B2_

ADJUSTING DEVICE AND CONTROL CABLE WITH ADJUSTING DEVICE

FIELD OF THE INVENTION

This invention relates to an adjusting device for adjusting the allowance length of an inner cable, and to a control cable with the adjusting device, more specifically to an adjusting device for adjusting the allowance length (effective fitting length) of an inner cable which is used to connect the inner cable of a push-pull control cable connecting the transmission and the shift lever of automobiles to the shift lever or transmission, and to a control cable provided with the device.

BACKGROUND ARTS

[Patent Document 1] Japanese Published Patent Application No. 2003-166521
[Patent Document 2] Japanese Published Patent Application No. 2004-257488

In Patent Document 1, the coupling device of a control cable 100 shown in FIG. 6a and FIG. 6b is disclosed. This coupling device has a rod 101 connected to an inner cable and a housing 102 connected to the rod. The base end (cable connection side) of the housing 102 is coupled to the rod 101 position-adjustably, and in the front end side, an eye end 104 coupled to a pin 103 turnably is provided integrally.

In the housing 102, as shown in FIG. 6b, a lock member (lock piece) 106 is provided, which inhibits the movement of the rod 101 when it is pushed in toward the arrowhead P1 and permits the movement when it is pulled out toward the arrowhead P2. The reference numeral 107 is a lock lever (slider) for constraining the lock member in its pushed-in state.

In the assembling process to couple the inner cable and the rod 101 of this type, first, a slider 107 is moved toward the base end side as shown in FIG. 6a to make the housing 102 and the rod 101 be relatively movable.

In this condition, the eye end 104 is coupled to the mating pin 103. And then, the position of the housing 102 and the rod 101 is adjusted so as to pull the inner cable so that there is no slack and given a suitable tension. And, the lock piece 106 is pushed in at a suitable position to constrain the relative movement of the housing 102 and the rod 101. After that, the slider 107 is moved toward the front end side. Thus, the suitable tension and the allowance length are secured.

In Patent Document 2, though being almost the same with as the coupling device 100, a coupling device is disclosed in which, on the occasion shifting from interim attachment to real attachment, the manipulation portion of the both sides of the lock piece is bent inside by just like pinching to insert into the holder for locking. The cap face of the lock piece is formed so that it provides the outer surface having the same curvature radius with the periphery of the casing. Therefore, when in a locked position, the cap of the lock piece is flush with the periphery of the casing.

DISCLOSURE OF INVENTION

A conventional adjusting device of a control cable is incorporated in the shift lever side provided in the inside of an automobile. However, when it is attached to the transmission side provided outside of the automobile, it is necessary to cover the adjusting device entirely using a cover (boot) for preventing operational failure caused by the infiltration of rain, water, or dust. When the entire adjusting device is covered, it is difficult to discern whether the device is locked or unlocked. Consequently, the worker must remove the cover to check the state of lock, which is troublesome.

The surface shape of the device is compared herein on the occasion when the coupling device 100 of Patent Document 1 is shifting its state from being unlocked to being locked. When it shifts to the locked state, the surface shape of the device is, concerning the lock piece portion, lowered as much as the height of the lock piece being inserted, but it is not taken inside of the holder completely, and there remains a protruding portion from the holder in the surface shape of the device. At the same time, the slider moves so as to approach the lock piece side. Thus, in the above coupling device 100, there is no distinct difference in the surface state between the lock state and the unlock state. Therefore, once the cover for water proofing and dust proofing is attached, there appears a clump that looks like it surrounds the lock piece and the slider in the outer surface of the cover, causing difficulties of discriminating the unlock state and lock state by visual means. Moreover, it is difficult to discriminate by tactile means because of lack of a distinct difference in the surface shape.

In the clamping member of Patent Document 2, it is necessary to employ a process to insert the lock piece by pinching both sides of the manipulating portion of the lock piece. Such process is difficult to carry out when the clamping member is covered by the cover closing up the ability to use a visual sense. The lock piece can be protruded from the clamping body in the unlock state and it can be made to be flush with the surface of the clamping body. However, the discrimination between the unlock state and the lock state can be done more easily by sensing some degree of tactile feeling and confirming the lock state than in the case that there is no discriminating means on the surface of the clamping body in the lock state.

Consequently, this invention is directed to provide an adjusting device, by which, using a simple mechanism, it is possible to discriminate with precision whether the device is in the lock state or in the unlock state by visual means and tactile means even from above the cover.

An adjusting device is equipped with a rod and a holder which is movably disposed in the length direction of the rod at an end of the rod, being capable of adjusting the allowance length of an inner cable connected to the rod. It comprises a lock piece provided movably between an unlock position where it protrudes from the holder and does not constrain the relative motion of the holder and the rod and a lock position where it is pushed in the holder and constrains the relative motion of the holder and the rod, a lock-discriminating member protruding from the periphery of the holder, and a cover which covers the periphery of the holder including the lock-discriminating member and the lock piece, wherein the lock piece does not protrude from the periphery of the holder at the lock position and protrudes to the same height as the lock-discriminating member at the lock position.

In the adjusting device, the lock piece is preferably to cause the cover to form a mound from inside at the unlock position. wherein at the periphery of the holder, a slider is provided slidably for locking or for releasing so as to make the lock piece not to return the unlock position when it reaches the lock position, and wherein the lock-discriminating member is provided in the slider and the lock-discriminating member preferably doubles as a knob-piece for sliding the slider. Further, a bead portion is formed annularly at the periphery of the cover and a knob-piece of the slider is preferably disposed inside of the bead portion.

The second embodiment of the adjusting device of this invention is equipped with a rod and a rough cylindrical holder which is movably disposed in the length direction of the rod at an end of the rod, being capable of adjusting the allowance length of an inner cable connected to the rod. It comprises a lock piece provided movably between an unlock position where it protrudes from the holder and does not constrain the relative motion of the holder and the rod and a lock position where it is pushed in the holder and constrains the relative motion of the holder and the rod, and a slider which is provided slidably on the periphery of the holder being flush with the periphery for locking or for releasing so as to make the lock piece not to return the unlock position when it reaches the lock position, wherein the lock piece moves to be flush with the periphery of the holder at the lock position.

A control cable with the adjusting device of this invention comprises any of the above described embodiments of the adjusting device, and a flexible inner cable connected to the rod of the adjusting device, and a flexible outer casing which guides the inner cable slidably.

In the adjusting device of this invention, the lock piece protrudes from the outer surface of the holder so that the height thereof is about same as that of the lock-discriminating member. Thereby, in the outer surface of the cover, there appears such a shape that the lock-discriminating member and the lock piece are integrated to be a clump. In contrast, in the lock state, since the lock piece is inserted into the holder and does not protrude from the periphery of the holder, in the outer surface of the cover, there is left only a mounded portion formed by the lock-discriminating member. Therefore, it is possible to check the lock-discriminating member by tactile sense even from above the cover and to discriminate easily whether it is in the unlock state or in the lock state.

In such a case that the adjusting device makes the lock piece form a mound in the cover from inside in the unlock position, in the unlock state, the cover is formed into a mound by the lock piece from inside, and in the outer surface of the cover there appears such a shape that the lock-discriminating member and the lock piece are integrated to form a clump. In contrast, in the lock state, the mounded portion by the lock-discriminating member only is left in the surface of the cover, thereby the shape by the lock piece and the lock-discriminating member appearing in the outer surface of the cover becomes small. Thus, since the visual difference of the lock state and the unlock state is large, discrimination of the lock state and the unlock state is possible by visual means together with tactile means.

In the case that at the periphery of the holder, a slider is provided slidably for locking or for releasing so as to make the lock piece not to accidentally return the unlock position when it reaches the lock position, and the lock-discriminating member is provided in the slider and the lock-discriminating member doubles as a knob-piece for sliding the slider, the lock-discriminating member can be provided without using a new member.

In the case that a bead portion is formed annularly at the periphery of the cover and a knob-piece of the slider is disposed inside of the bead portion, since the cover of the portion of the lock-discriminating member is previously mounded, the cover which elastically deforms repetitively between the unlock state and the lock state is hard to be damaged by the protruded lock-discriminating member. In the lock state, the bead portion appears annularly in the outer surface of the cover, but in the unlock state, since the mounded portion by the lock piece is formed as if the neat annular shape is broken, it is easy to discriminate the unlock state visually.

In the second embodiment of the adjusting device of this invention, when the lock piece is pushed into the rough cylindrical holder, it becomes flush with the periphery of the holder. Therefore, the cover can be attached to the periphery of the cylindrical holder so as to contact almost closely. And, in the lock state, the outer surface has a neat cylindrical shape. In contrast, when the lock piece protrudes from the periphery of the holder, it destroys the neat cylindrical shape enabling easy discrimination of the lock state and the unlock state even from above the cover.

Since the control cable with the adjusting device of this invention is equipped with the above adjusting device, it is easy to attach the control cable and to adjust the allowance length of the control cable.

BRIEF DESCRIPTION OF DRAWINGS

FIG. 2b is a cross section taken along line 2b-2b of FIG. 2a;

FIG. 4b is a cross section taken along line 5b-5b of FIG. 4a;

DETAILED DESCRIPTION

Figure 1:
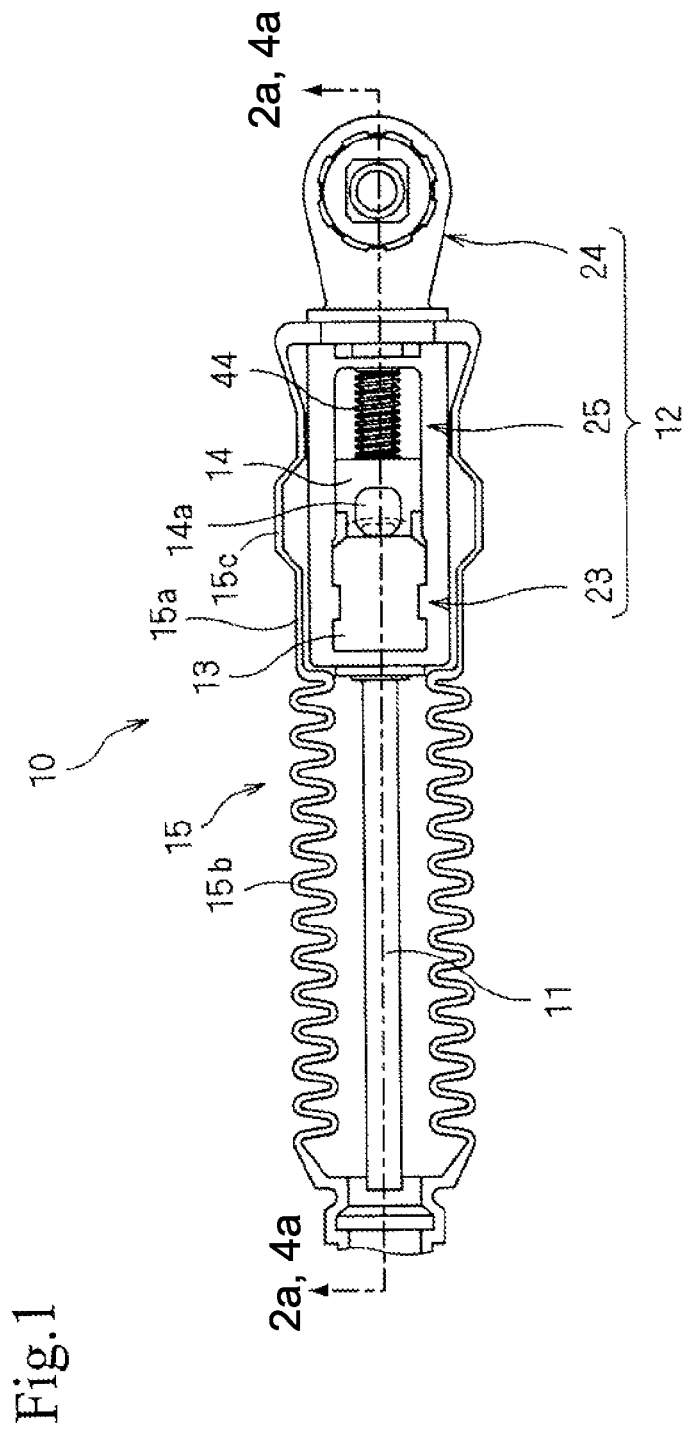
FIG. 1 is a plane view showing an embodiment of this invention.

Then, referencing the drawings, embodiments of the adjusting device and the control cable with the adjusting device is described. The adjusting device 10 shown in FIG. 1 and FIG. 2 is equipped with a rod 11, a holder 12 which is movably disposed in the length direction of the rod at an end of the rod, a lock piece 13 provided in the holder in the direction perpendicular to the axial direction, connected so as to be capable of rising and falling freely, a slider 14 provided in the holder movably in the axial direction, and a cover 15 for covering the adjusting device 10 including the holder 12, the lock piece 13, and the slider 14, to provide water proofing and dust proofing thereto.

Figure 3:
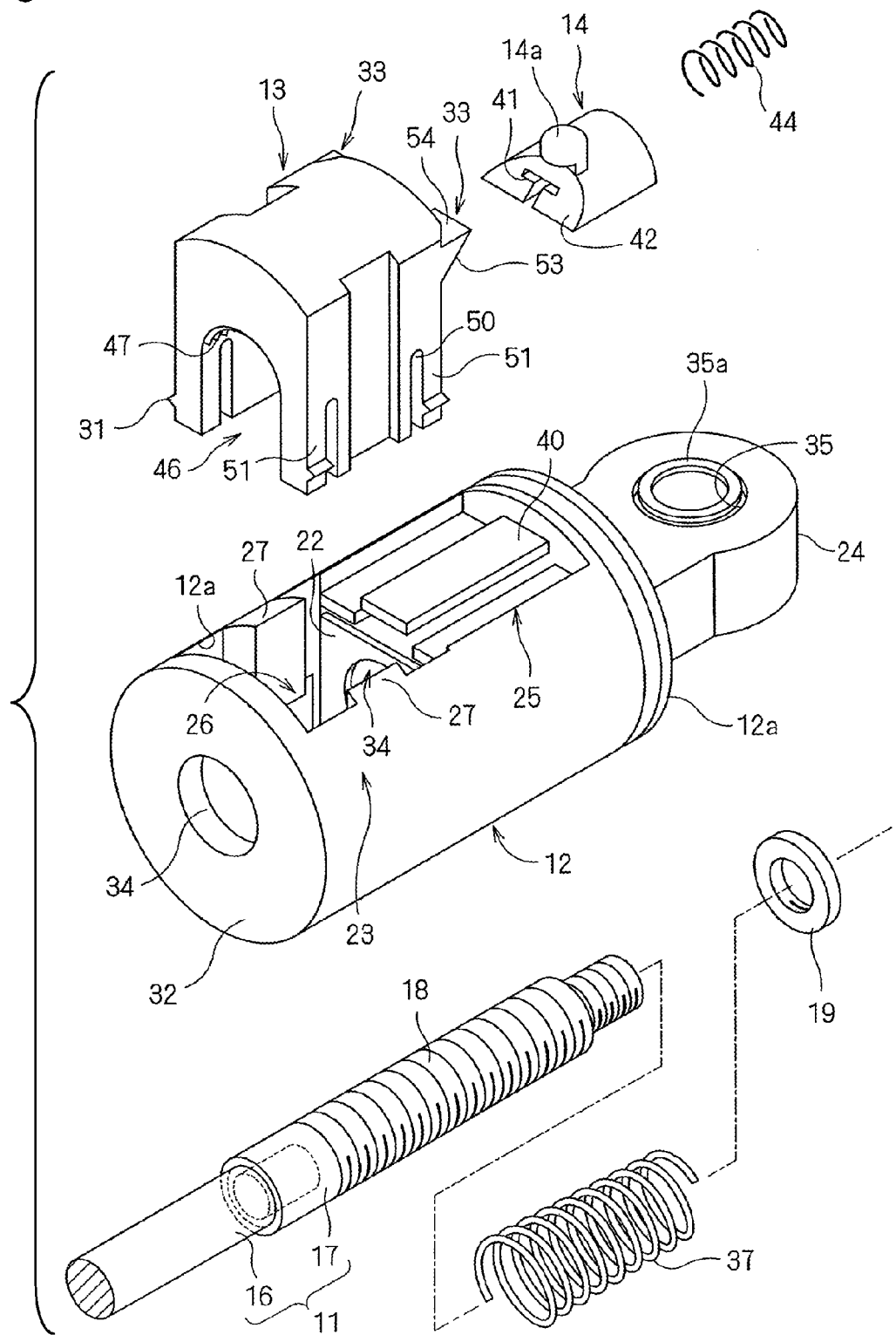
FIG. 3 is a perspective view of the adjusting device of FIG. 1 before assembling.

Referring to FIG. 3, each portion is described in detail. The rod 11 has a shaft 16 and a large diameter portion 17 provided near the front end, and in a part of the periphery of the large diameter portion, a male screw 18 is formed. The male screw is an engaging portion for engaging with the lock piece 13, and in place of the male screw, a continually disposed annular groove row or annular protrusion row can be used. To the front end of the rod 11, a spring receptacle 19 such as an E-ring etc which doubles as a stopper is attached.

To the base end of the rod 11, an inner cable (not shown) is connected. The inner cable is, for example, that of push-pull control cable and has flexibility. The inner cable configures a control cable together with a flexible outer casing (not shown) which guides the inner cable slidably forms a control cable (not shown). As the shaft 16 of the rod 11, as is publicly known, one made of metal is used. The large diameter portion 17 can be formed by insert molding of synthetic resin to the front of the shaft 16. But, the whole body may be integrated from synthetic resin or metal or may be combined after forming being formed separately The holder 12 is equipped with a guide portion 23 shaped like a box or frame, a slider holding portion 25 extending toward the front end, and an eye end 24 disposed on the front end side of the holder 12. In the periphery of the vicinity of the forward end of the slider holding portion 25, a perimeter groove 12a is formed to latch the cover 15. The guide portion 23 is equipped with a cavity 26 having rough rectangular cross section for slidably guiding the lock piece 13 in the up and down direction. In the right and left inner wall of the cavity, a guide protrusion 27 protrudes from the inner wall, extending from the upper edge of the guide portion 23 to a midway position on the wall. Further, there is a partition plate 22 between the guide portion 23 and the slider holding portion 25 to divide them.

Figure 2A:
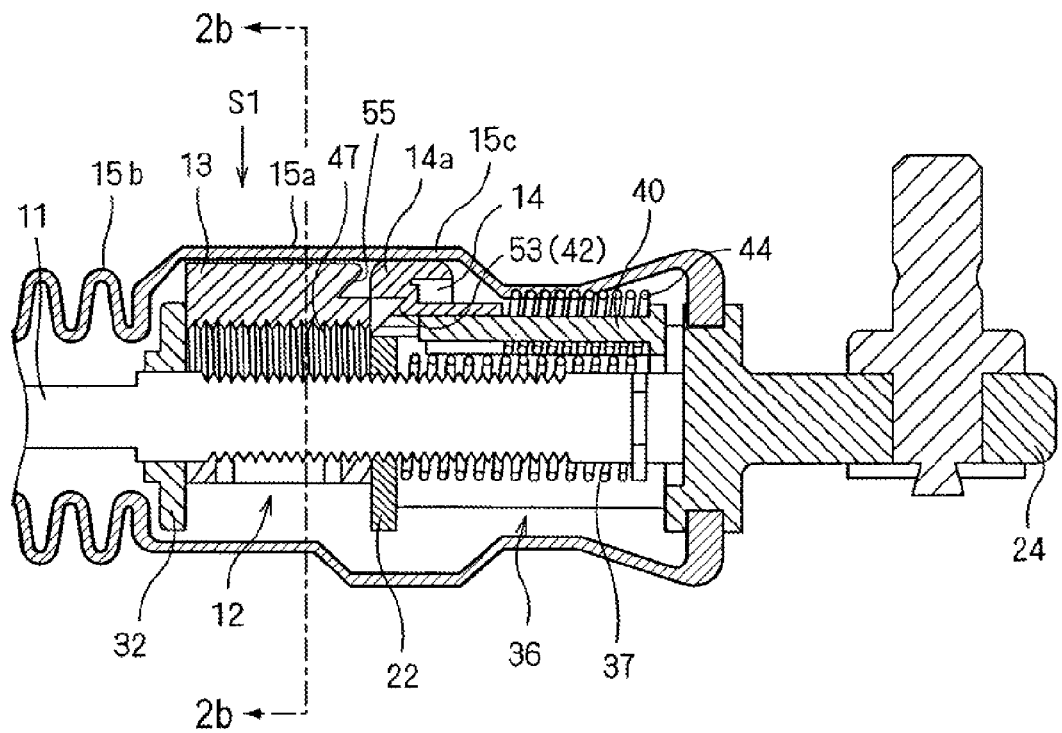
FIG. 2a is a longitudinal cross section of the unlock state of the adjusting device of FIG. 1.
Figure 2B:
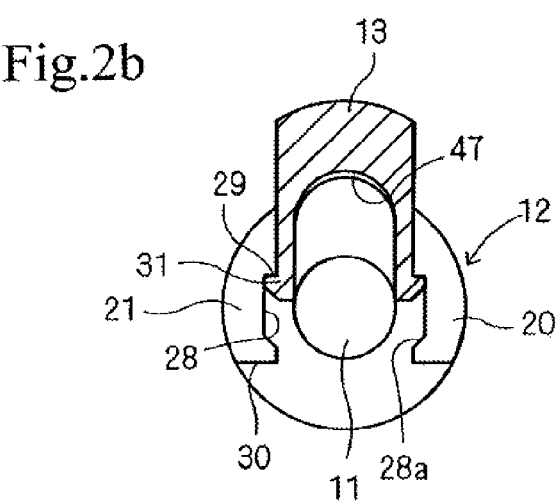

As shown in FIG. 2b, in the under part of the right and left inner wall 20, 21 of the guide portion 23, an engaging concave portion 28 is formed. The engaging concave portion 28 is not extended to the lower edge of the wall and is stopped midway. The upper edge of the engaging concave portion 28 is an engaging step portion 29, and together with the under face 30 of the guide portion 23, it forms an engaging portion with which the engaging claw 31 engages. More specifically, the engaging step 29 acts as a stopper for preventing the lock piece 13 from dropping out of the guide portion 23. The under face 30 acts as a stopper for keeping the lock piece in the lock state. The step portion 28a of the lower edge of the engaging concave portion 28 is tapered so as to make it easy for the engaging claw 31 to pass through.

As shown in previous FIG. 3, in the partition plate 22 of the guide portion and the back side (left side in FIG. 3) wall 32, through holes 34, 34 are formed through which the large diameter portion 17 of the rod 11 passes. The through hole 34 is continued through and into to the slider holding portion 25. Under the slider holding portion 25, a rectangular opening portion 36 (see FIG. 2a) is formed. Inside of the back end side of the opening portion 36, the back end of a first spring 37 is latched. The first spring 37 is a compressing coil spring in this embodiment. The first spring 37 is fitted to the rod 11 and latched together with the spring receptacle 19 whose other end is fixed to the front end of the rod 11. Thereby, in the unlock state, the holder 12 is positioned always at the back side (left side in FIG. 1) with respect to the rod 11. In other words, it is positioned in a direction to shorten the allowance length of the inner cable 1.

The eye end 24 presents a sort of plate and in the front end of which a pin (see FIG. 2a) provided in the shift lever is fitted.

In the slider holding portion 25, a slider guide 40 having rough T character shape is extended from the eye end 24 side to towards the back side wall 32. The slider 14 having a surface shape which is flush with the periphery of the holder 12 is fitted slidably on the slider guide 40. Further, centered on the slider guide 40, the right and left guides 40a, 40a are formed on the both sides. Those guide 40a, 40a are disposed on the same plane with the upper end of the partition plate 22, and on the upper face of which the slider 14 slides.

From the back face to the front face of the slider 14, a hole 41 is formed into which the slider guide 40 having T character shape cross section is inserted. In the upper face of the front face of the slider 14, a tapered face 42 is formed. Between the back face of the slider 14 and the front end of the slider holding portion 25, a second spring 44 is interposed. The second spring 44 is a compression coil spring being fitted so as to surround the slider guide 40. Thereby, the slider 14 is always energized toward the back direction. Further, in the above of the slider 14, a knob piece 14a is formed to provide for manual operation. The knob-piece 14a comes down on the upper part of the tapered face 42 and holds down the upper face of the lock piece 13 when being in the lock state.

As shown in FIG. 2b and FIG. 3, the lock piece 13 has an appearance of rough rectangular solid, and in its under face side, a rough U character shape groove 46 is formed. Therefore, whole of the lock piece presents inverted U character shape. In the bottom face (bended face) of the groove 46, a female screw 47 engaging with the male screw 18 of the rod 11 is formed. In the case that an annular protrusion row is formed in the rod 11, a groove row meshing with the annular protrusion is formed in the groove 46. In the front and back of the side face of the lock piece 13, a slit 50 opening toward the under face is formed. The outer portion of the slit 50 is a flexible piece 51 which can bend right and left elastically (see FIG. 3).

In the vicinity of the upper end of the front face of the lock piece 13, right and left protrusions 33 are provided respectively. The under face of the protrusion 33 is a tapered face 53 which contacts the tapered face 42 of the slider 14 and slides. On the one hand, the upper front face of the protrusion 33 is made to be a flat plane 54 which contacts the lower face of the slider 14 so as to make the slider 14 slide toward the lock piece 13 when the lock piece 13 is inserted in to the holder 12. And, in the lock piece 13, above the flat plane 54, an inclined plane 55 faces downwardly toward the flat plane 54 (see FIG. 2a).

The holder 12, the lock piece 13, and the slider 14, are made of synthetic resin. But, they can be made of other materials, such as metal etc. In the above embodiment, the holder 12 and the lock piece 13 are shown as an integrated body respectively, but they can be configured by combining a plurality of members made of the same materials or different materials.

Figure 4A:
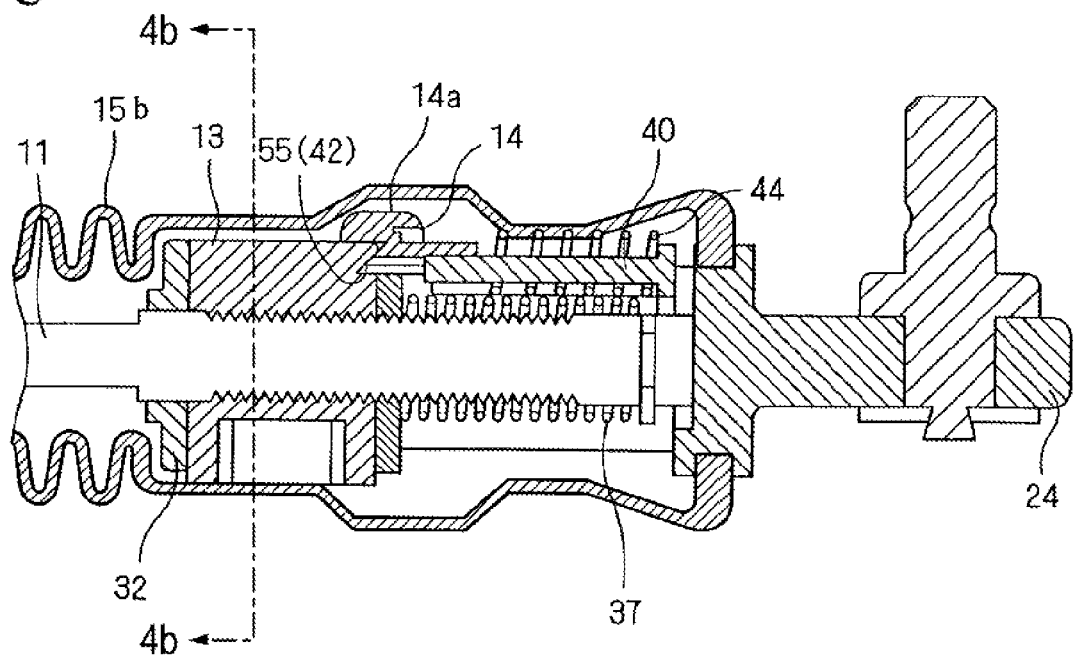
FIG. 4a is a longitudinal cross section of the lock state of the adjusting device of FIG. 1.

As shown in FIG. 2a and FIG. 4a, the cover 15 consists of the slider holding member 25, the lock piece 13, a cylindrical portion 15a covering the slider 14, and a cornice portion 15b extending backwardly from the cylindrical portion 15a. In the periphery of the cylindrical portion 15a of the cover on the opposite side from the cornice portion 15b, a bead portion 15c expanding outward is formed annularly, and inside of the protuberant row, the knob-piece 14a is disposed. The cornice portion 15b extends and contracts responding to the axial movement of the rod 11 by the operation of the inner cable. As the material for the cover 15, that which is excellent in water proof and durability quality is preferably used, and a rubber-like synthetic resin such as ethylene propylene rubber (EPDM) is preferable.

Then, the action of the adjusting device 10 configured as above is described per the lock state of the lock piece.
[Unlock State]

FIG. 2 shows the unlock state of the adjusting device 10. In this state, the upper part of the lock piece 13 protrudes from the holder, and the female screw 47 of the inside is not engaged with the male screw 18 of the rod 11. Therefore, the holder 12 is stopped at the position in the direction of shortening the allowance length of the inner cable by the energized force of the first spring 37. Further, the engaging claw 31 of the lock piece 13 fits engaging step portion 29. And, the engaging claw 31 of the lock piece 13 is held stably in the state of unlock and never drops out and flies off upward. Further, since the portion in which the male screw 18 is not formed in the large diameter portion 17 of the rod 1 is positioned under the lock piece 13, the lock piece 13 is prevented from accidently moving into the lock state in transit of the control cable with adjusting device only. The slider 14 is energized by the second spring 44, and its tapered face 42 contacts the front face of the lock piece 13. Since the upper part of the lock piece 13 is somewhat protruded from the holder 12, the surface of the cylindrical portion 15a of the cover is formed in a mound so as to be about the same height with the bead portion 15c, and there appears wholly a shape that the annular bead portion 15c and the rectangular shape of the lock piece 13 is integrated.

[Lock State]

Figure 4B:
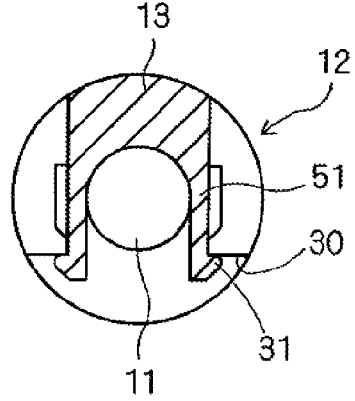

FIG. 4 shows the lock state of the adjusting device 10. In this state, the lock piece 13 is pushed into the holder 12, the upper face of which is flushed with the outer surface of the holder 12. Then what projects from the periphery of the holder is the knob-piece 14a of the slider only. And, the slider 14 slides so as to approach the vicinity of the lock piece 13. Viewing the condition from the outer surface of the cover 15, in the unlock state, the mounded portion of the cover 15 by the lock piece 13 disappears. Therefore, the bead face 15c of the cover 15 only is left, facilitating a visual check of the lock state.

To cause the adjusting device 10 to be in the lock state, the lock piece 13 is pushed in the direction of the arrowhead S1 of FIG. 2. On this occasion, the tapered face 53 (see FIG. 3) of the front lower face of the protrusion 33 of the lock piece contacts the tapered face 42 (see FIG. 3) of the front upper face of the slider. Thereby, the lock piece 13 receives the energizing force of the second spring 44 through the slider 14 and is energized upward. Therefore, the user pushes it in strongly on purpose. When the lock piece 13 is further pushed in, the protrusion 33 moves downward, climbing over the front end of the slider 14. After that, as shown in FIG. 4, the tapered face 42 of the slider 14 advances until it contacts the upper inclined face 55 of the lock piece, and the knob-piece 14a holds down the upper face of the lock piece 13. Accordingly, the user knows by the feeling of click at the time that the work is securely done. Thereby, the lock piece 13 is constrained in the lock position.

On the other hand, as known from FIG. 3, in the lock piece 13, the lower edge of the flexible piece 51 split by the slit 50 contacts the step portion 28a of the engaging step portion 28 (see FIG. 2b) and bends inside, then the engaging claw 31 moves downward along the inside of the holder 12. And then, when the engaging claw 31 comes to the position lower than the under face 30 of the holder 12, as shown FIG. 4b, it engages with the under face 30. Thereby, the lock state is kept more safely.

The above adjusting device 10 is used for a push-pull control cable coupling a shift lever and a transmission of automobiles. In this case, the other end side of the inner cable 1 is fixed to the shift lever side by a cable end fixing device, and the eye end 24 of the holder 12 is fixed to the engaging hole of a select lever of the transmission.

And then, the lock piece 13 is pushed in at a suitable position to lock the axial position relation of the rod 11 and the holder 12. Since in the pushing operation, as described above, a feeling of a click based on the cam action with the slider 14 is obtained, the user can easily know when the locking has been done. It facilitates the work when the adjusting operation is done blindly while not having a view of the lock piece, enabling the user to operate until securely reaching the lock state, which reduces faults to leave it be in the unlock state.

When the lock is desired to be released, the slider 14 is backed to release the engaging with the upper end of the lock piece 13, and the lock piece 13 is moved upward. Thereby, the unlock state of FIG. 1 recurs.

In the above embodiment, the first spring 37 energizes the rod 11 and the holder 12 in the direction to shorten the allowance length of the inner cable, but inversely it can be energized in the direction to prolong the allowance length. In addition, it can be realized by the use of a helical extension spring as the first spring 37 in place of the compression coil spring.

Additionally, in the case that the cover 15 is caused to be in the shape of a mound from inside by the lock piece 13, it is possible to determine previously the shapes of convexity and concavity of the cover 15 by striating the cover 15 with a pleat line. By doing this, the shapes giving largely different impressions depending on the unlock state and the lock state can be made. Further, in this embodiment, the bead portion 15c is formed in the portion of the cover 15 corresponding to the portion of the knob-piece 14a, but the cover 15 can be moved into a mound shape from inside with the portion of the knob-piece 14a by making the front end of the knob-piece 14a be rounded so as not to break the cover 15. On this occasion, if the knob-piece 14a and the lock piece 13 are disposed with a bit of space, it is possible to form the portion taken over between the knob-piece 14a and the lock piece 13 into a mound at the same time, enabling to form the shape of a clump larger than the real size of the lock piece 13 in the outer surface of the cover 15.

In the case that the knob-piece 14a of the slider is not provided, covering the holder 12 with the cover 15 forms a neat cylindrical shape. Therefore, when the lock piece 13 protrudes from the outer surface of the holder 12, the collapse of the neat cylindrical shape is prominent. Thus, the variation of the surface shape of the holder 12 is prominent enabling the user to discriminate whether the adjusting device is in the unlock state or in the lock state.

Figure 5A:
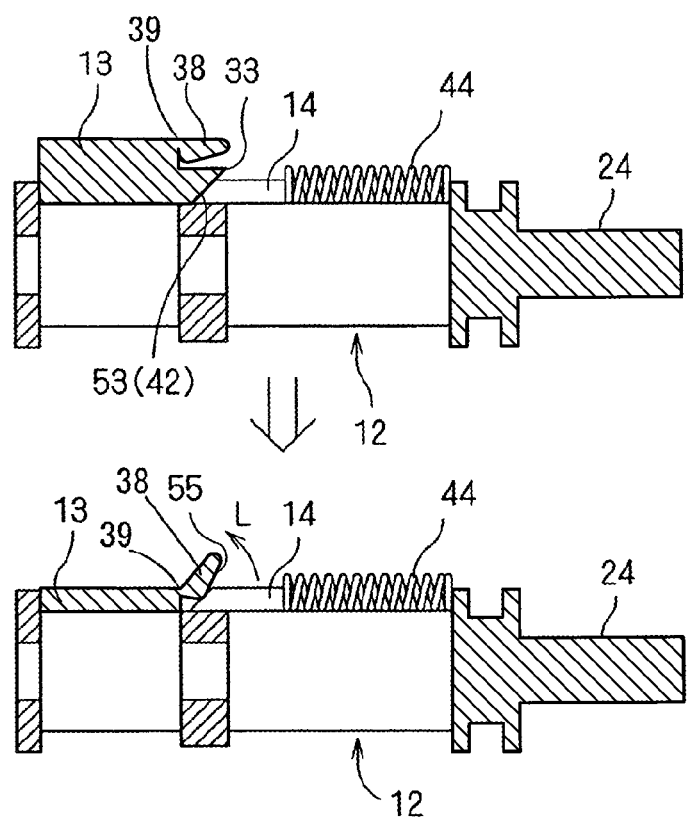
FIG. 5a is an outline cross section showing the other embodiment of the lock piece and the lock discriminating member.
Figure 5B:
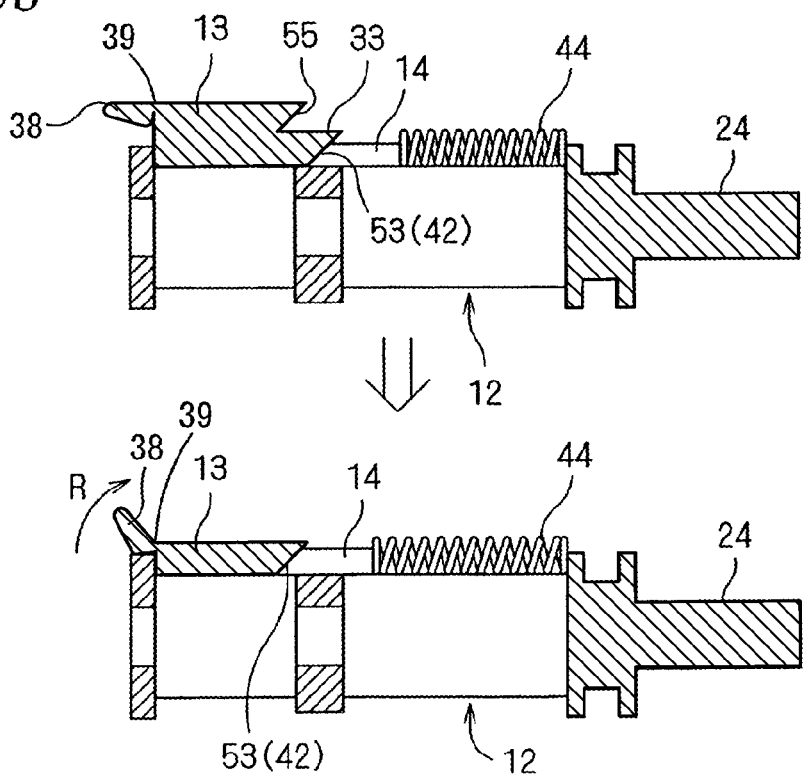
FIG. 5b is an outline cross section showing further the other embodiment of the lock piece and the lock discriminating member.
Figure 6A:
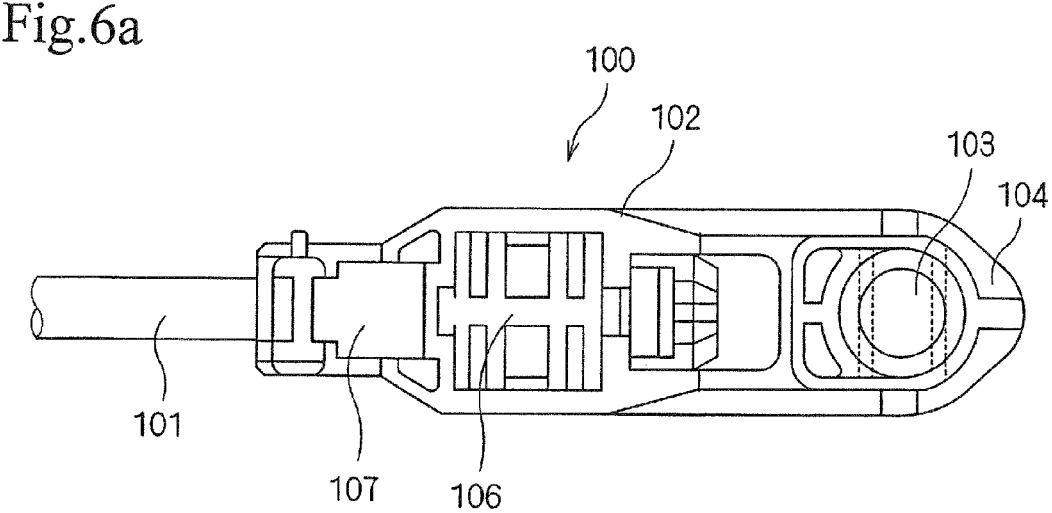
FIG. 6a is a plane view showing an example of conventional adjusting device.
Figure 6B:
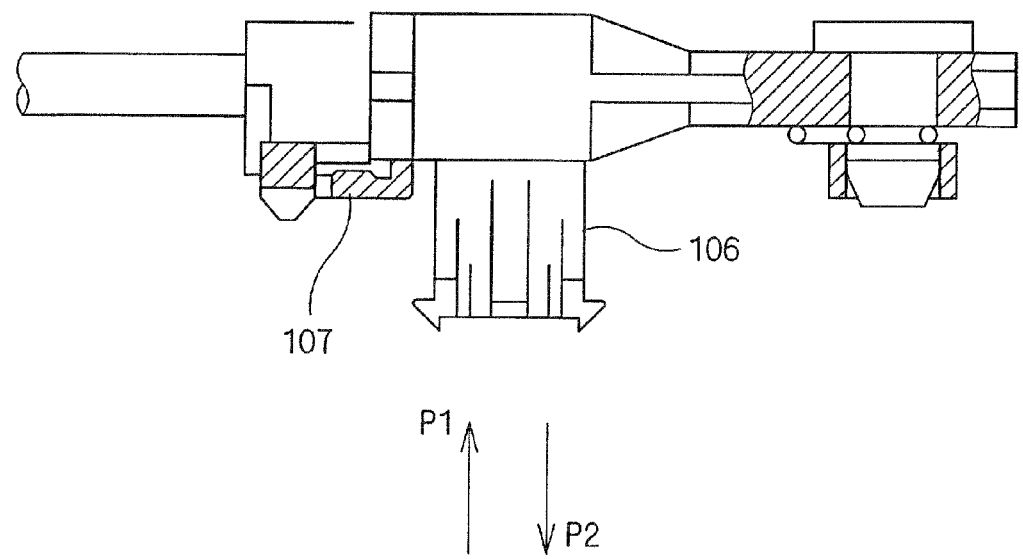
FIG. 6b is a side view of the conventional adjusting device.

In the adjusting device 10 of FIGS. 1 and 2, the knob-piece 14a which serves as a lock-discriminating member is provided in the slider 14, but, as shown in FIG. 5a and FIG. 5b, the lock-discriminating member 38 can be provided in the lock piece. In FIG. 5a, the other embodiment of the lock piece 13 and the lock-discriminating member 38 is shown. In the lock piece 13 shown in FIG. 5a, the lock-discriminating member 38 is provided on the above of the flat portion 54 so as to be able to bend, In this embodiment, the lock-discriminating member 38 is coupled to the lock piece 13 with a hinge 39 of the back end, and the rough arc shaped inclined face (cam face 55) is formed in the under face.

The lock-discriminating member 38 is, in the unlock state, mounted on the upper face of the flat face 54. When the lock piece 13 is pushed into the holder 12, the slider 14 is energized by the second spring 44, and the tapered face 42 and the inclined face 55 of the lock-discriminating member 38 slide with respect to one another. Then, the slider 14 slides so as to drive out the lock-discriminating member 38 upward. Accordingly, the lock-discriminating member 38 turns toward the arrowhead L to stand up from the outer surface of the holder 12. Therefore, in the lock state, it is easy to feel or see the standing up lock-discriminating member 38.

In FIG. 5b, a further the other embodiment of the lock piece 13 and the lock-discriminating member 38 is shown. In this, the lock-discriminating member 38 is provided bendably in the back of the lock piece 13 which is flush with the upper face of the lock piece 13 in the unlock state and stands up in the lock state. The lock-discriminating member 38 is formed so that, when the holder 12 is pushed into the holder 12, it cannot move toward downward together with the lock piece because it is barred by the outer perimeter of the opening 26 of the holder, and stands up in the direction of the arrowhead R while being bended. Therefore, the standing up lock-discriminating member 38 enables a user to discriminate whether it is in the unlock state or in the lock state by a visual sense or tactile sense.

What is claimed is:

1. An adjusting device comprising:
a rod;
a holder which is movably disposed in the length direction of the rod;
a first spring fitted to the rod to bias the holder in a given position;
a lock piece provided movably between an unlock position where the lock piece protrudes from the holder in a direction perpendicular to an axial direction and does not constrain the relative motion of the holder and the rod and a lock position where the lock piece is pushed in the holder and constrains the relative motion of the holder and the rod;
a lock-discriminating member protruding from a periphery of the holder in the direction perpendicular to the axial direction;
a flexible cover which covers the periphery of the holder including the lock-discriminating member and the lock piece, the cover having a cylindrical portion extending over at least a part of the lock piece and a bead portion extending over the lock-discriminating member and extending from one end of the cylindrical portion, wherein the lock piece has an upper face, the lock-discriminating member has an upper face, and the lock piece does not protrude from the periphery of the holder at the lock position and the lock piece protrudes from the periphery of the holder such that the upper face of the lock piece is disposed at about the same height as the upper face of the lock-discriminating member at the unlock position;
an engaging claw extending radially outwardly from a lower outer surface of the lock piece to engage with the holder;
a slider slidably connected at the periphery of the holder;
a tapered face formed in an upper face of a front face of the slider;
a second spring interposed between a back face of the slider and a front end of a slider holding portion, the second spring biasing the slider toward a back of the lock piece;
a knob piece extending from the slider to enable manual operation of the slider, the knob piece is disposed over an upper part of the tapered face and holds down the upper face of the lock piece when in a locked state;
protrusions extending from an upper end of a front face of the lock piece, and
wherein an under face of the protrusions is tapered and contacts the tapered face of the slider, so that the lock piece receives an energizing force of the second spring through the slider and is energized upward in the direction perpendicular to the axial direction toward the unlock position,
wherein an upper face of each of the protrusions is a flat plane which contacts a lower face of the slider so as to enable the slider to slide toward the lock piece when the lock piece is inserted into the holder; and
wherein in the lock piece above the flat plane of the protrusions, an inclined plane faces downwardly toward the flat plane,
wherein when the lock piece is in the unlock position, the cylindrical portion and the bead portion are flush with one another, and when the lock piece is in the lock position, the bead portion extends annularly outwardly from the cylindrical portion.

2. The adjusting device according to claim 1, wherein the lock piece causes the cover to form a mound from an inside of the cover when the lock piece is in the unlock position.

3. The adjusting device according to claim 1, wherein the lock-discriminating member is provided in the slider and the lock-discriminating member doubles as the knob piece for sliding the slider.

4. The adjusting device according to claim 2, wherein the bead portion is formed annularly at a periphery of the cover and the knob piece of the slider provided in the holder is disposed inside of the bead portion.

5. The adjusting device according to claim 4, the cylindrical portion has a part covering the lock piece;
wherein when the lock piece is in the lock position, a diameter of the part covering the lock piece is smaller than a diameter of the bead portion; and
wherein when the lock piece is in the unlock position, the lock piece cause the part covering the lock piece to form a mound from inside, the part covering the lock piece and the bead portion are flush with one another.

6. An adjusting device comprising:
a rod;
a holder which is movably disposed in the length direction of the rod;
a first spring fitted to the rod to bias the holder in a given position;
a lock piece provided movably between an unlock position where the lock piece protrudes from the holder in a direction perpendicular to an axial direction and does not constrain the relative motion of the holder and the rod and a lock position where the lock piece is pushed in the holder and constrains the relative motion of the holder and the rod;
a lock-discriminating member protruding from a periphery of the holder in the direction perpendicular to the axial direction;
a flexible cover which covers the periphery of the holder including the lock-discriminating member and the lock piece, wherein the lock piece has an upper face, the lock-discriminating member has an upper face, and the lock piece does not protrude from the periphery of the holder at the lock position and the lock piece protrudes from the periphery of the holder such that the upper face of the lock piece is disposed at about the same height as the upper face of the lock-discriminating member at the unlock position;
a slider slidably connected at the periphery of the holder, for locking or for releasing so as to prevent the lock piece from returning to the unlock position when the lock piece reaches the lock position, and wherein the lock-discriminating member is provided in the slider and the lock-discriminating member doubles as a knob piece for sliding the slider,
a tapered face formed in an upper face of a front face of the slider, wherein the knob piece is disposed over an upper part of the tapered face and holds down the upper face of the lock piece when in a locked state;
a bead portion formed annularly at a periphery of the cover and the knob piece of the slider provided in the holder is disposed inside of the bead portion;
an engaging claw extending radially outwardly from a lower outer surface of the lock piece to engage with the holder;
a second spring interposed between a back face of the slider and a front end of the slider holding portion, the second spring biasing the slider toward a back of the lock piece;
protrusions extending from an upper end of the front face of the lock piece, and
wherein an under face of the protrusions is tapered and contacts the tapered face of the slider, so that the lock piece receives an energizing force of the second spring through the slider and is energized upward in the direction perpendicular to the axial direction toward the unlocked position, wherein an upper face of each of the protrusions is a flat plane which contacts a lower face of the slider so as to allow the slider to slide toward the lock piece when the lock piece is inserted into the holder; and wherein in the lock piece, above the flat plane of the protrusions, an inclined plane faces downwardly toward the flat plane.

* * * * *